US005411691A

United States Patent [19]

Hwang

[11] Patent Number: 5,411,691

[45] Date of Patent: May 2, 1995

[54] METHOD OF MANUFACTURING CONTAINERS FROM HUSKS

[75] Inventor: Ta S. Hwang, Taichung,

[73] Assignees: Kuo-Chung Chang-Chien; Fong-Ying Cheng-Chang; Ming Ta Wang, all of Taichung, Taiwan, Prov. of China

[21] Appl. No.: 194,043

[22] Filed: Feb. 9, 1994

[51] Int. Cl.[6] .......... B29C 43/00

[52] U.S. Cl. .......... 264/115; 264/83; 264/119; 264/120

[58] Field of Search .......... 264/109, 115, 119, 120, 264/83

[56] References Cited

U.S. PATENT DOCUMENTS 4,111,744 9/1978 Reiniger .......... 264/120
4,627,951 12/1986 Shen .......... 264/109
5,017,319 5/1991 Shen .......... 264/124
5,093,051 3/1992 Reiniger .......... 264/294
5,217,665 6/1993 Lim et al. .......... 264/83
5,366,677 11/1994 Mahanov .

*Primary Examiner*—Mary Lynn Theisen
*Attorney, Agent, or Firm*—Ralph F. Crandell; Holland & Hart

[57] ABSTRACT

A method of manufacturing containers from husks, which includes the steps of:

(a) crushing husks into powder form;
(b) mixing the powder with edible glue and steam to form a paste material;
(c) rolling the paste material into a strip;
(d) pressing the strip into containers with desired configuration; and
(e) drying said containers.

5 Claims, 2 Drawing Sheets

METHOD OF MANUFACTURING CONTAINERS FROM HUSKS

BACKGROUND OF THE INVENTION

The present invention relates to a method of manufacturing containers from husks.

Containers are used widely in our daily living, and which are used and ultimately discarded at a tremendous rate. Most of the containers are made of paper or chemical materials, such as polypropylene (P.P.) and polystyrene foam, all of these containers have certain drawbacks. For a paper container, it cannot be heated and is made of wood-pulp which is obtained by cutting trees; for a container made of chemical materials, it cannot receive hot contents as that may produce some toxic materials, and some of the toxic materials have been proven to cause cancer. Furthermore, the chemical material cannot be bio-degradable.

The present invention intends to provide a method of manufacturing containers from husks to mitigate and/or obviate the above mentioned problems.

SUMMARY OF THE INVENTION

The present invention provides a method of manufacturing containers from husks, such as those of rice, which includes five steps of crushing husks into powder form and mixing the powder by 97% in volume with edible glue by 3% in volume and saturated steam at 200° C. for 30 minutes to form a paste material, rolling the paste material into strip and pressing the strip into containers with a pressing pressure about 120 kg/cm$^2$ to form containers in desired shape and then drying the containers at a temperature of 60° C. to 80° C.

The objects, advantages, and novel features of the invention will become more apparent from the following detailed description when taken in conjunction with the accompanying drawings.

DETAILED DESCRIPTION OF THE PREFERRED EMBODIMENT

Figure 1:
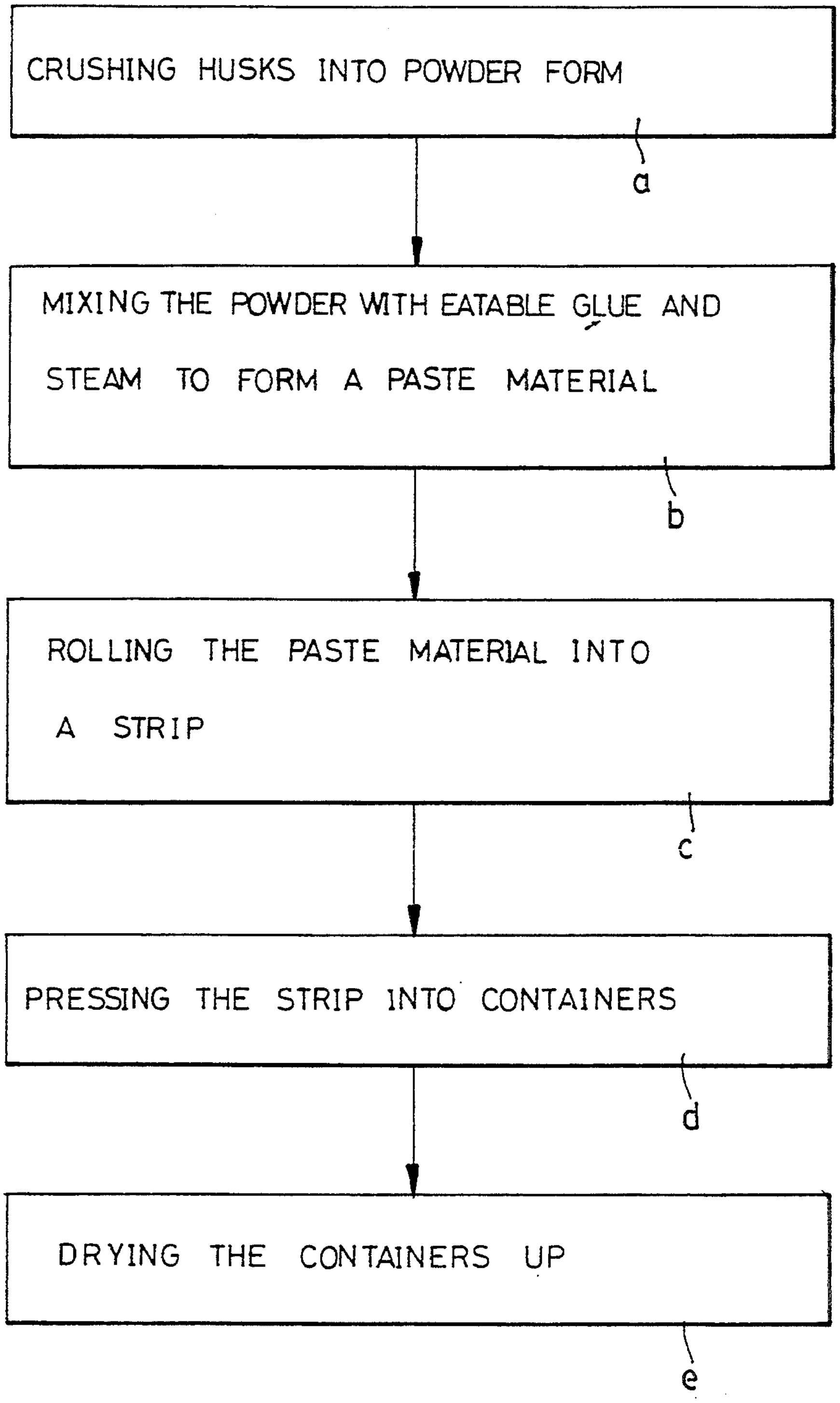
FIG. 1 is a block diagram of manufacturing processes in accordance with the present invention.
Figure 2:
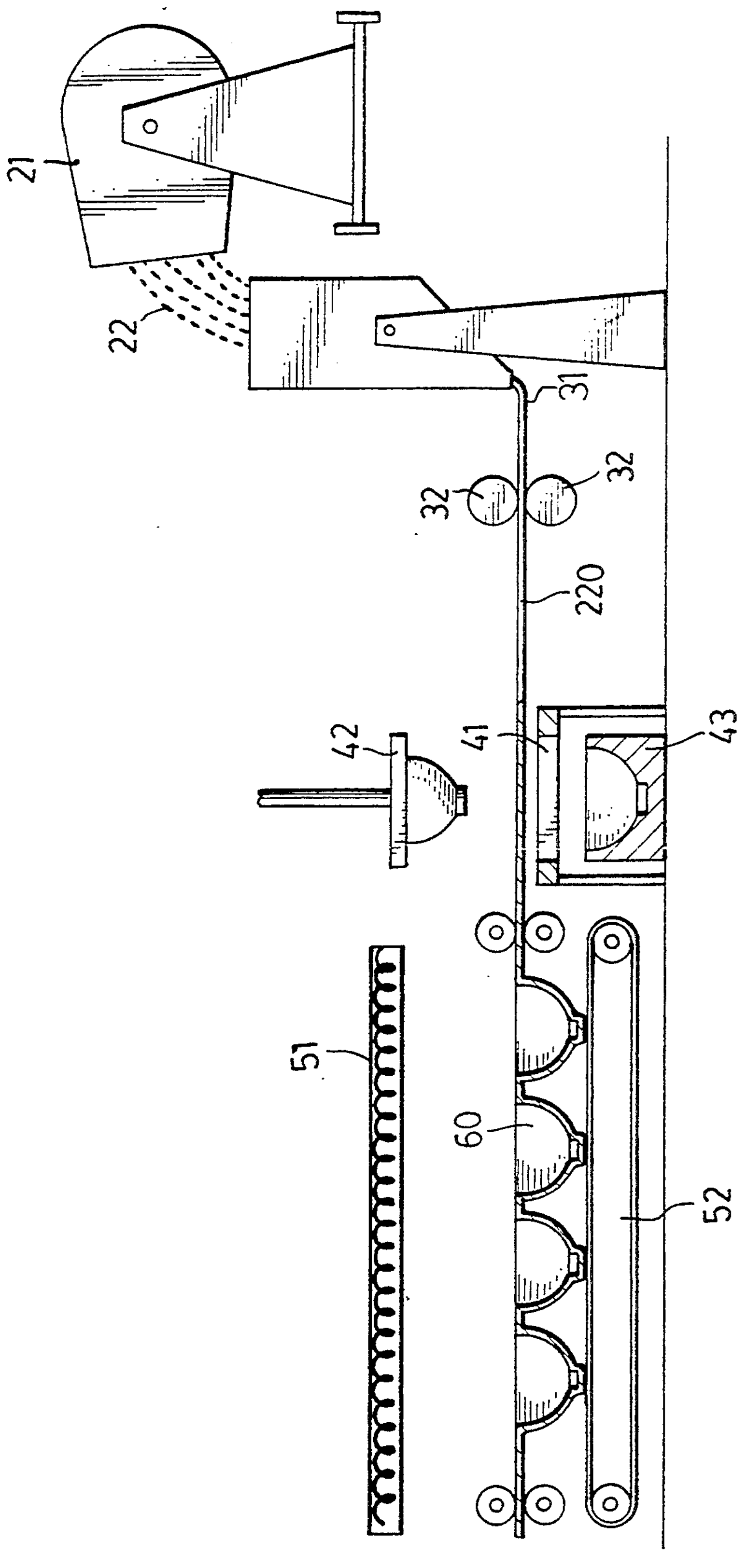
FIG. 2 is a side elevational view of a container manufacturing process in accordance with the present invention.

Referring to the drawing, a method of manufacturing containers from husks, such as those of rice, in accordance with the present invention generally includes five steps (a) to (e), step (a) is to crush husks into powder 22 by pouring the husks into a crushing mill 21, step (b) is to mix the powder 22 by 97% in volume with edible glue, such as carboxy methyl cellulose, by 3% in volume and saturated steam at 200° C. for 30 minutes to form a paste material 31, step (c) is to roll the paste material 31 into a strip 220 by passing the paste material 31 through a gap formed two rollers 32, step (d) is to press the strip 220 into a concave container shape 60 with a pressing pressure of 120 kg/cm$^2$ by appropriate molding dies 41, 42 and 43, and step (e) is to guide the containers 60 onto a conveyer 52 and to dry the containers 60 under a heater 40 at a temperature of 60° C. to 80° C.

According to the present invention, a huge amount of waste husks can be utilized to produce various kinds of containers, which not only reduce the pressure of dealing with the husks but create huge economical benefit. Besides that, to use the husk can effectively reduce the requirement of wood-pulp, which in turn reduces the rate of cutting down trees.

Although the invention has been explained in relation to its preferred embodiment, it is to be understood that many other possible modifications and variations can be made without departing from the spirit and scope of the invention as hereinafter claimed.

I claim:

1. A method of manufacturing containers from husks comprising the steps of:

(a) crushing husks into powder form;

(b) mixing said powder with edible glue and steam to form a paste material;

(c) rolling said paste material into a strip;

(d) pressing said strip into containers with desired configuration; and (e) drying said containers.

2. The method as claimed in claim 1 wherein said mixing of said step (b) is at a volume rate of 97% powder and 3% edible glue and which are mixed with saturated steam at 200° C. for 30 minutes.

3. The method as claimed in claim 1 wherein a pressure of said pressing of said step (d) is 120 kg/cm$^2$.

4. The method as claimed in claim 1 wherein a temperature of said drying of said step (e) is in the range of 60° C. to 80° C.

5. The method as claimed in claim 1 wherein said edible glue is carboxy methyl cellulose.

* * * * *